Sept. 4, 1934.   A. B. GARDNER   1,972,337
AIRCRAFT PROPELLER
Filed June 5, 1933
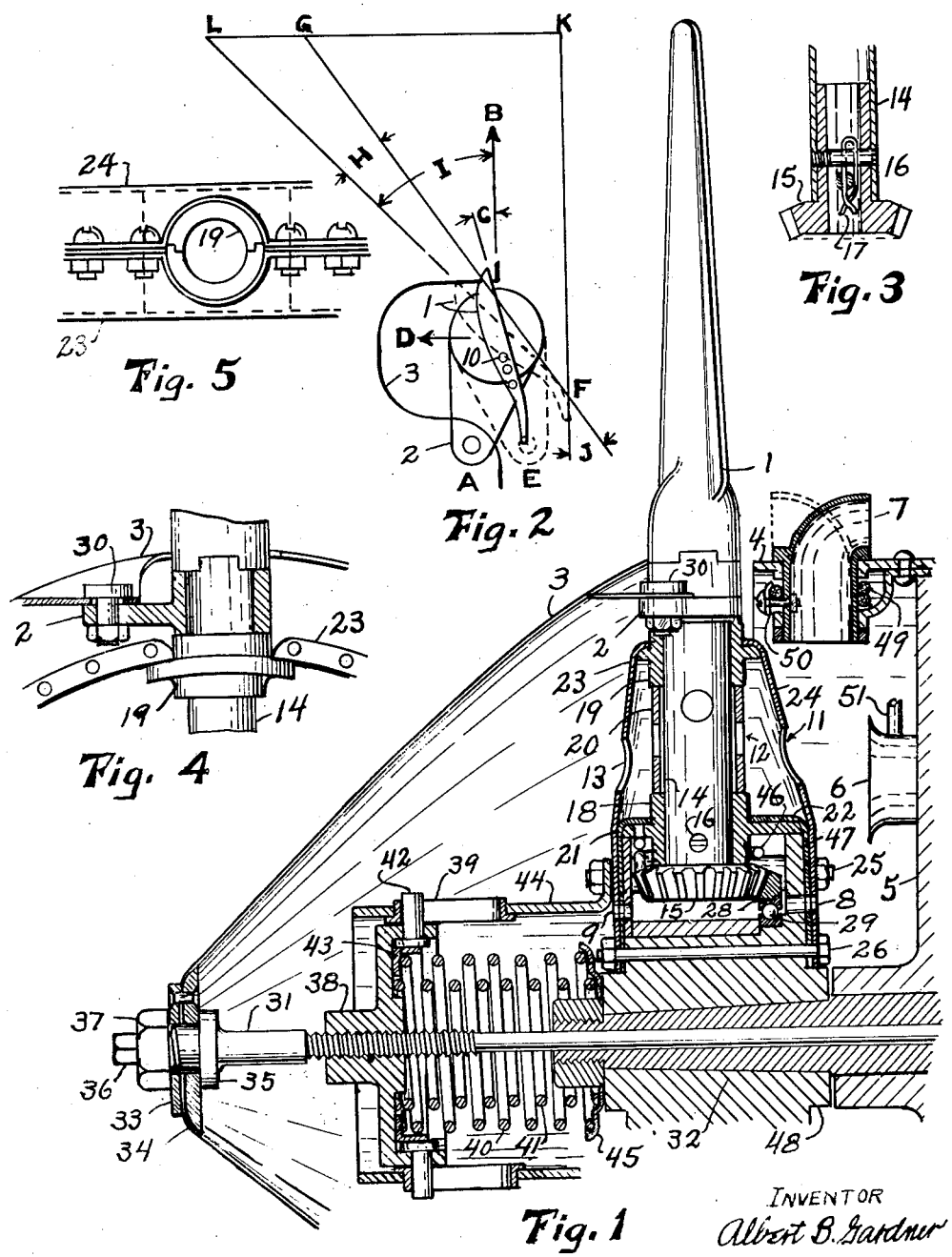
INVENTOR
Albert B. Gardner Patented Sept. 4, 1934

1,972,337

UNITED STATES PATENT OFFICE

1,972,337

AIRCRAFT PROPELLER

Albert B. Gardner, Racine, Wis.

Application June 5, 1933, Serial No. 674,340

20 Claims. (Cl. 170—162)

This invention relates to aircraft propellers and more specifically to aircraft propellers of the so-called controllable-pitch type.

One of the objects of the invention is to provide a practical construction of simple, positive, efficient and dependable character, by means of which the pitch of the propeller blades are automatically controlled, within certain limits, while in operation. Another object is to provide pressure responsive means adapted to maintain the most effective angle of attack of the blades, during "take-off" and all subsequent relative-air speeds. Another object is to provide manually operative means for controlling the air pressure conditions which surround and operatively effect the said pressure responsive means. Another object is to provide means for maintaining the pitch-angle of the propeller blades uniform with each other. Another object is to provide a construction by means of which the heat of the engine exhaust gases may be utilized to prevent the formation of ice on the propeller and its pitch controlling mechanism. Another object is to provide means for reducing the pitch-angle of the blades to its minimum, while the aircraft is at high speed, to the purpose that the action of the air on the blades may provide a retarding action to control the speed of the aircraft. Other objects and advantages will be in part obvious and in part pointed out hereinafter. The invention accordingly consists in the features of construction, combination of elements, the arrangement of parts as will be exemplified in the structure to be hereinafter described and the scope of the application of which will be indicated in the following claims.

In the accompanying drawing, in which is shown one of various possible embodiments of the several features of this invention.

Figure 1 is a substantially central sectional view of the device along the center-line of the supporting elements of one of the propeller blades, some parts being shown in elevation.

Figure 2 is a partial plan view of one of the pitch controlling crank arms and a diagram illustrating the variableness of the pitch-angle of the propeller blade; a portion of the trailing edge of the cone-shaped diaphragm, showing a portion cut away to allow for its fore and aft movement and the point where it is connected to the crank arm, are in evidence.

Figure 3 is a substantially central sectional view of the bevel gear on the end of the blade shaft; the method for connecting the gear to the shaft is in evidence.

Figure 4 is a substantially central sectional view of the pitch controlling crank arm illustrating, in elevation, the method used to connect it pivotally to the cone-shaped diaphragm; the outer bearing which supports the blade shaft being shown in elevation to illustrate the flange which supports the bearing within its housing against the action of centrifugal force; it also serves to illustrate similar features of the inner bearing.

Figure 5 is a plan view of the outer bearing; a portion of the housing halves and the method of clamping them together around the bearing; this will also serve to illustrate similar features of the inner bearing and its retaining housing.

Referring to the drawing in detail, 1 is one of three or more propeller blades; if two only are used then there must be provided two stub shafts similarly mounted on radial lines and spaced at ninety degrees from the propeller shaft to extend through and be supplied with crank arms 2 for supporting the cone-shaped diaphragm 3; these propeller blades are made, preferably, of duralumin and hollow; 4 is an annular cylindrical ring extending from the surface 5, which may represent the engine frame or some part of the aircraft, to a point near to the propeller, which annular ring together with the cone-shaped diaphragm 3 form a chamber substantially surrounding the propeller hub and the pitch controlling mechanism; 6 is an opening from which the engine exhaust gases, a flow of air, induced by flight, by a difference in the air pressure on the inner and outer sides of said chamber or by mechanical means, may enter the chamber; the inlet opening to opening 6 to be provided with a ventilator similar to 7 and similarly operated to induce a flow of air into, or out of, said chamber 7 is one of several ventilators pivotally mounted through the wall of 4; 8 and 9 are openings through the propeller hub flange into the inner chamber providing a passageway for the hot exhaust gases through the hollow propeller and out through the holes 10, see Figure 2, in the tip of the propeller blade 1; openings 11, 12, and 13 are for the purpose of allowing free circulation of the hot exhaust gases to all parts of the mechanism; 14 is the blade shaft preferably formed integral with the blade 1 or welded thereto; 15 is a bevel gear connected fixedly to shaft 14 and secured thereto by means of pins 16 which in turn are secured by wire 17; 18 and 19 are the inner and outer bearings respectively made preferably of aluminum and balanced in weight and center of gravity one with another; 20 is a tubular spacer interposed between the bearings 18 and 19; 21 and 22 are annular, cup-shaped rings, preferably made of sheet duralumin pressed to the desired form, the function of which is to hold the inner bearings in place; 23 and 24 are annular, cup-shaped rings which support the outer bearings and provide a substantial support to resist the moment of thrust of the propeller blades; 25 is one of several double-shoulder bolts for clamping the housing members to the propeller hub 48; 26 is one of several turned bolts, in reamed holes, functioning with 25; 28 is a ring-gear for equalizing the pitch-changing force and to maintain a uniform pitch-angle among all blades; 29 is a ball bearing for supporting and controlling the position of the ring-gear 28 in relation to its mating gear 15; 2 is one of several crank arms mounted fixedly on blade shaft 14 for controlling the pitch-angle of blade 1; 30 is one of several crank pins for pivotally connecting the arm 2 to the diaphragm; 3 is a cone-shaped diaphragm preferably made of sheet duralumin pressed or spun to the desired shape and pivotally connected at its trailing edge to crank arm 2 and fixedly mounted at its apex on spring actuating shaft 31 one end of which shaft is slidably mounted inside of the propeller shaft 32; 33 and 34 are reinforcement plates riveted or welded to 3; 35 is a collar fixedly disposed on shaft 31; 36 is the squared end of shaft 31 to facilitate its adjustment to position; 37 is a nut mounted by screw threads on shaft 31 to lock the diaphragm in position; 38 is an annular cup-shaped piece mounted by closely fitting screw threads on shaft 31, and slidably disposed between the inner flanges of the several slot reinforcements 39, its function is to control the tension of the springs 40 and 41 while in action and the position of diaphragm 3; 42 is one of several, preferably four, pins fixedly disposed in the outer wall of 38 and slidably disposed within the slot reinforcement piece 39, the function of pins 42 is to assist in controlling the rotative movement of 38 and the fore and aft movement of the pitch controlling mechanism together with the maximum and minimum pitch-angle of the propeller blades; 43 is an annular, cup-shaped ring, slidably disposed against the inner ends of pins 42, its function is to hold the heads of pins 42 against the inner surface of the outer wall of 38; 44 is a cylindrical device flanged at one end to facilitate its attachment to the propeller hub and provided with slots at 39 to co-act with pins 42 in their functions; 45 is an annular grooved ring the function of which is to control the position of the rear end of springs 40 and 41 which springs are of the compression type the function of which is to urge the propeller blades, through their pitch controlling mechanism, to their lowest predetermined pitch-angle which motion is limited by the contact of pins 42 with the forward end of slot 39; 46 is a spring of the torsion type the ends of which are rotatably and opposedly disposed, one between the teeth of the bevel gear 15 and the other in a hole drilled into the flange of bearing 18, the function of which spring is to urge the crank pin 30 against the diaphragm 3 to eliminate back-lash; 47 is an annular flange formed integrally with the propeller hub 48 to provide reinforcement against torsional strains; 49 is a wire cable for use in controlling the radial direction of the outlet of ventilators 7, this cable may be conducted over pulleys located at suitable points between the ventilators whereby its tangential action may be maintained parallel with the plane motion of the ventilators 7 as they are rotated in the variation of their functions and finally conducted to a convenient point within the pilot's chamber where their motion may be controlled by a windlass or other suitable device; 50 is a clamp for fixing the cable 49 to the ventilators 7; 51 is an oil pipe opening into opening 6 to provide positive means for lubricating the propeller mechanism during flight.

The device operates as follows: referring to the drawing, Figure 2 shows in solid lines the pitch of the propeller blade and Figure 1 the radial position of the ventilator openings; these may be termed the normal position of those two features when the propeller is at rest, while the engine is idling and for a short period during the "take-off" of the plane. During this period the propeller blade at its mean effective diameter is attacking the air at angle "C", shown at about 15 degrees in the drawing; the tip of a propeller properly designed for this work would then be attacking the air at about ten degrees and the blade at its innermost useful radius would be attacking the air at about the angle just before burble begins.

To explain the diagram in Figure 2: the aircraft travel and the effective thrust of the propeller are in direction of the arrow "D", the propeller plane-movement is in direction of arrow "B" at the beginning of the "take-off", the pitch controlling crank-arm being in position "A" and the propeller blade moving in a direction parallel to line "F" "K", attacking the air at angle "C"; as the speed of the aircraft increases the difference in the pressure of the air, on the fore and aft sides of the operating mechanism, moves the pitch controlling arm toward position "E" at which point the pitch of the propeller blade has been increased to angle "I", however the aircraft having moved forward along the pitch-line "K" "L" to position "G", during one revolution of the propeller, the blade is consequently attacking the air at angle "H" a very effective and efficient angle of attack. The trailing edge of the propeller blade may be turned up to form a reverse pitch angle represented in the drawing by "J" which, together with the fact that the dimension from the trailing edge to the center of the blade shaft is greater than that from the center to the leading edge, provides an unbalanced condition of the blade which materially assists in controlling the pitch when suddenly encountering a stiff head-wind or when the pitch is suddenly reversed to provide a retarding action. While the engine is idling, at the beginning of the "take-off" and until the aircraft has gained considerable forward speed, the outlets from the ventilators 7 may be held in the radial position shown in solid lines in Figure 1 in which position the air within said ventilators is acted upon by the blast from the propeller and the flow of air incidental to flight inducing a passage of air from the propeller hub chamber and producing more or less of a vacuum which counteracts the compression of the springs 40 and 41 preparatory to the hunting action of the mechanism to vary the pitch. The specific rate of the aircraft's speed at which this hunting begins may be determined or controlled by changing the radial position of the ventilator outlets; the maximum amount of variations being shown in the two views of 7, in Figure 1, one in solid and one in dotted lines.

In other words the elements 40 and 41 in response to potential energy stored therein together with the action of the air, incidental to the revolving motion of the blades, on the unbalanced condition of the blade area and supplemented by the relative wind incidental to flight in parallel harmonious action with the openings in ventilators 7, act constantly to urge the propeller blades to their lowest allowable pitch-angle and element 3, and the reverse pitch angle contiguous to the trailing edge of the propeller blade, in response to the air pressure induced by relative air speed, act constantly to urge the propeller blades to their maximum allowable pitch-angle; these elements, being endowed with pressure responsiveness, co-act to automatically maintain the most effective pitch-angle at all relative air speeds.

Ventilator 7, being pivotally supported and manually operatable, affords supplemental means, co-acting with the flow of air, incidental to flight, along the outer walls of the hub-chamber, to control the air pressure within said chamber and inasmuch as it may be so positioned, in regard to the radial direction of its outlet as to control the effectiveness of the ventilators, the pilot will be able thereby to change the pitch angle, at will, during flight and to control the approximate air-speed at which said change in the pitch-angle begins. Ventilator 7 may also be used, positioned as shown in dotted lines, to compel the blades to return to their lowest allowable pitch-angle, at high relative-air speeds, producing thereby a retarding action to control the speed of the aircraft. Referring to Figure 2 of the drawing: since it is clear that the blade is attacking the air at angle "C" while the craft is at rest and at angle "H" while the craft is traveling at its maximum rate of speed or at a rate which would move it forward a distance indicated by line K—G during one revolution of the propeller, then it is equally true that were the pitch-angle of the blade suddenly reduced to its lowest allowable degree, during the aforesaid high rate of speed of the craft, the blade would then be attacking the air at the reverse pitch-angle indicated by the difference between angle "I" and the sum of the angles "C" and "H". As an example: assume the angle "I" to be 45 degrees and the other two 15 each then this reverse angle of attack would be 45 minus 30 or 15 degrees under which conditions the entire energy expended by the motor would be transformed from a very effective forward thrust to a very effective backward thrust.

Now, since it is true that: the pitch-angle of the propeller blade, the power of the engine (consequently the engine throttle opening), the angle of attack of the wings and the structural resistance of the craft, are all factors used in determining the most efficient cruising speed of the craft and that a change in the value of any one or more of these factors would alter the final result, also that: where the correct value of each of these factors obtain at "take-off", the craft will automatically gain in momentum until said cruising speed is reached and remain constant thereafter, then it follows that: for that identical craft, were it possible to vary the pitch-angle during flight, there would be a certain pitch-angle and engine throttle opening at the setting of which the speed of the craft, regardless of the initial speed at which this setting was made, would be automatically advanced or retarded (as the condition required) to, and be maintained at, any specific rate included within a range between that speed just sufficient to sustain flight and the highest of which the engine power was capable.

The required skill and attention of the pilot, the cost of operation and serious accidents caused by the hazard of flying at night or during conditions of low visibility would be greatly reduced and the safety of flying as well as the range of usefulness of aircraft would be greatly increased by use of this invention with its automatic pitch-control mechanism.

The various angles, shapes, dimensions etc., are for the purpose of illustration only and should not limit the invention or method of producing the desired effect within the scope of the invention.

Having described the invention sufficiently to enable anyone well skilled in the art to manufacture and use the same, what I claim is:

1. In aircraft propeller construction, a propulsion unit comprising, in combination, a plurality of propeller blades pivotally supported concentrically about a hub and rotatable therewith in a radial plane, a chamber surrounding the hub, ventiator openings so disposed and positioned in the walls of said chamber as to co-act with the relative wind incidental to flight in automatically controlling the air pressure within said chamber, and means for automatically controlling the pitch-angle of said blades with reference to their plane of travel.

2. In aircraft propeller construction, a propulsion unit comprising, in combination, a plurality of propeller blades pivotally supported concentrically about a hub and rotatable therewith, a chamber surrounding the hub, ventilator openings so disposed and positioned in the walls of said chamber as to co-act with the relative wind incidental to flight in automatically controlling the air pressure within said chamber, pitch control mechanism, and means for automatically operating said pitch control mechanism by differences in air pressure on different parts of the mechanism.

3. In aircraft propeller construction, a propulsion unit comprising, in combination, a plurality of propeller blades pivotally supported concentrically about a hub and rotatable therewith, a chamber surrounding said hub, ventilator openings so disposed and positioned in the walls of said chamber as to co-act with the relative wind incidental to flight in automatically controlling the air pressure within said chamber, pitch control mechanism, and means for automatically operating said pitch control mechanism by differences in air pressure on the outer and inner sides of said chamber.

4. In aircraft propeller construction, a propulsion unit comprising, in combination, a plurality of propeller blades pivotally supported concentrically about a hub and rotatable therewith, a chamber surrounding said hub, ventilator openings so disposed and positioned in the walls of said chamber as to co-act with the relative wind incidental to flight in automatically controlling the air pressure within said chamber, pitch control mechanism, means for automatically operating said pitch control mechanism by differences in air pressure on the outer and inner sides of said chamber, and supplemental means for automatically controlling the air pressure within said chamber.

5. In aircraft propeller construction, a propulsion unit comprising, in combination, a plurality of propeller blades pivotally supported concentrically about a hub and rotatable therewith, a chamber surrounding said hub, ventilator openings in said chamber, pitch control mechanism, means for automatically operating said pitch control mechanism by differences in air pressure on the outer and inner sides of said chamber, supplemental means for automatically controlling the air pressure within said chamber, and manually operative means for controlling said supplemental means.

6. In aircraft propeller construction, a propulsion unit comprising, in combination, a plurality of propeller blades pivotally supported concentrically about a hub and rotatable therewith, a reverse pitch angle contiguous to the trailing edge of said blades, a chamber surrounding said hub, ventilator openings so disposed and positioned in the walls of said chamber as to co-act with the relative wind incidental to flight in automatically controlling the air pressure within said chamber, pitch control mechanism, and means for automatically operating said pitch control mechanism by differences in air pressure on different parts of the mechanism including the unbalanced features contiguous to the trailing edges of the propeller blades.

7. In aircraft propeller construction, a propulsion unit comprising, in combination, a plurality of propeller blades pivotally supported concentrically about a hub and rotatable therewith, a reverse pitch angle contiguous to the trailing edge of said blades, a chamber surrounding said hub, ventilator openings so disposed and positioned in the walls of said chamber as to co-act with the relative wind incidental to flight in automatically controlling the air pressure within said chamber, pitch control mechanism, means for automatically operating said pitch control mechanism by differences in air pressure on different parts of the control mechanism including the unbalanced features of the propeller blades, and mechanical means for predetermining the extreme maximum and minimum amount of angularity of pitch of said blades.

8. In aircraft propeller construction, a propulsion unit comprising, in combination, a plurality of propeller blades pivotally supported concentrically about a hub and rotatable therewith, a chamber about said hub, ventilator openings so disposed and positioned in the walls of said chamber as to co-act with the relative wind incidental to flight in automatically controlling the air pressure within said chamber, a reverse pitch angle contiguous to the trailing edge of said blades, pressure responsive means for automatically controlling the pitch angle of said blades, means for predetermining the extreme maximum and minimum amount of angularity of pitch of said blades, and means for maintaining the pitch-angle, of all blades, alike at all times.

9. In aircraft propeller construction, a propulsion unit comprising, in combination, a plurality of propeller blades pivotally supported concentrically about a hub and rotatable therewith, a chamber about said hub, ventilator openings so disposed and positioned in the walls of said chamber as to co-act with the relative wind incidental to flight in automatically controlling the air pressure within said chamber, pitch control mechanism including a cone-shaped diaphragm located on the fore side of said hub of a substantial forwardly projected area suitable for dividing the air-stream incidental to flight and conducting said air in a more dense condition and consistent speed at the trailing edge of said cone where it impinges upon the air within the ventilator openings in the aforesaid chamber, producing a difference in air pressure on different parts of said control mechanism for automatically actuating said mechanism.

10. In aircraft propeller construction, a propulsion unit comprising, in combination, a plurality of propeller blades pivotally supported concentrically about a hub and rotatable therewith, a chamber about said hub, pitch control mechanism, and ventilator openings pivotally supported concentrically about said chamber for automatically controlling the air pressure within said chamber.

11. In aircraft propeller construction, a propulsion unit comprising, in combination, a plurality of propeller blades pivotally supported concentrically about a hub, and rotatable therewith, a chamber about said hub, pitch control mechanism within said chamber, means for lubricating said mechanism while in operation, means for operating said control mechanism by differences in air pressure on the inner and outer sides of said chamber, ventilator openings pivotally supported concentrically about said chamber for automatically controlling the air pressure within said chamber, and means for manually controlling the radial direction of said ventilator openings.

12. In aircraft propeller construction, a propulsion unit comprising, in combination, a plurality of propeller blades pivotally supported concentrically about a hub and rotatable therewith, a chamber about said hub, ventilator openings so disposed and positioned in the walls of said chamber as to co-act with the relative wind incidental to flight in automatically controlling the air pressure within said chamber, pressure responsive means, associated with said chamber, adapted to control the pitch-angle of said blades and pressure responsive means for controlling the movement of said last-mentioned means.

13. In aircraft propeller construction, a propulsion unit comprising, in combination, a plurality of propeller blades pivotally supported concentrically about a hub and rotatable therewith, a chamber about said hub, ventilator openings so disposed and positioned in the walls of said chamber as to co-act with the relative wind incidental to flight in automatically controlling the air pressure within said chamber, pressure responsive means, associated with said chamber, adapted to control the pitch-angle of said blades, pressure responsive means for controlling the movement of said last-mentioned means and means for limiting the amount of movement of said pressure responsive means.

14. In aircraft propeller construction, a propulsion unit comprising, in combination, a plurality of propeller blades pivotally supported concentrically about a hub and rotatable therewith, a chamber substantially about said hub, ventilator openings so disposed and positioned in the walls of said chamber as to co-act with the relative wind incidental to flight in automatically controlling the air pressure within said chamber, pressure responsive means, associated with said chamber, adapted to automatically control the pitch-angle of said blades, pressure responsive means for controlling the movement of said last-mentioned means, means for limiting the amount of movement of said pressure responsive means and means for automatically controlling the pressure-differences which actuate said pressure responsive means.

15. In aircraft propeller construction, a propulsion unit comprising, in combination, a plurality of propeller blades pivotally supported concentrically about a hub and rotatable therewith, a chamber substantially surrounding said hub, ventilator openings so disposed and positioned in the walls of said chamber as to co-act with the relative wind incidental to flight in automatically controlling the air pressure within said chamber, pressure responsive means, associated with said chamber, adapted to automatically control the pitch-angle of said blades, pressure responsive means for controlling the movement of said last-mentioned means, means for limiting the amount of movement of said pressure responsive means, means for automatically controlling the pressure-differences which actuate said pressure-responsive means and manually operative means adapted to control the means which automatically control the pressure-differences which in turn actuate said pressure-responsive means.

16. In aircraft propeller construction, a propulsion unit comprising, in combination, a plurality of feathering blades pivotally supported concentrically about a hub and rotatable therewith, a chamber substantially surrounding said hub, ventilator openings so disposed and positioned in the walls of said chamber as to co-act with the relative wind incidental to flight in automatically controlling the air pressure within said chamber, pressure responsive means co-acting with said blades to automatically control the pitch-angle of said blades and means for automatically maintaining the pitch-angle of said blades uniform, one with another, at all times.

17. In aircraft propeller construction, a propulsion unit comprising, in combination, a plurality of blades pivotally supported concentrically about a hub and rotatable therewith, a chamber substantially surrounding said hub, ventilator openings so disposed and positioned in the walls of said chamber as to co-act with the relative wind incidental to flight in automatically controlling the air pressure within said chamber, a reverse-pitch angle contiguous to the trailing edge on said blades, pressure responsive means, associated with said blades, adapted to automatically control the pitch-angle of said blades, means for automatically maintaining a like angularity of all said blades and pressure responsive means adapted to automatically change the pitch-angle of all said blades simultaneously.

18. In aircraft propeller construction, a propulsion unit comprising, in combination, a plurality of propeller blades pivotally supported concentrically about a hub and rotatable therewith, a chamber substantially surrounding said hub, pressure responsive means, associated with said chamber, adapted to utilize the difference in air pressure between the outer and inner surfaces of said chamber to control the pitch-angle of said blades, the forward end of said chamber formed into a shape suitable for dividing the air-stream incidental to flight and conducting it in a more dense condition to the periphery of said chamber, and ventilator openings, pivotally supported through the outer walls of said chamber, adapted to utilize the air-stream flowing along the outer surface of said chamber to control the pressure within said chamber.

19. In aircraft propeller construction, a propulsion unit comprising, in combination, a plurality of propeller blades pivotally supported concentrically about a hub and rotatable therewith, a chamber substantially surrounding said hub, ventilator openings pivotally supported through the outer walls of said chamber adapted to utilize the relative wind incidental to flight to control the air pressure within said chamber, pressure responsive means adapted to co-act with said wind and ventilators to control the pitch-angle of said blades and manually operative ventilator control mechanism by means of which the pilot may change the effectiveness of the ventilators, during the flight of the craft, to any desired degree within the range of their capacity, from zero to one-hundred per cent of its vacuum producing capacity or from zero to one-hundred per cent of its pressure producing capacity.

20. In aircraft propeller construction, a propulsion unit comprising, in combination, a plurality of propeller blades pivotally supported concentrically about a hub and rotatable therewith, a chamber substantially surrounding said hub, ventilator openings pivotally supported through the walls of said chamber adapted to utilize the relative wind incidental to flight to control the air pressure within said chamber, pressure responsive means adapted to co-act with said wind and ventilators to control the pitch-angle of said blades and manually operative ventilator control mechanism by means of which the pilot may so position the ventilator openings as to direct a flow of air into the interior of said chamber, during the rapid flight of the craft, producing an air pressure within said chamber to coact with a compression element, in urging the blades to their lowest allowable pitch-angle thereby bringing about a retarding action for controlling the speed of the craft.

ALBERT B. GARDNER.